No. 782,169.

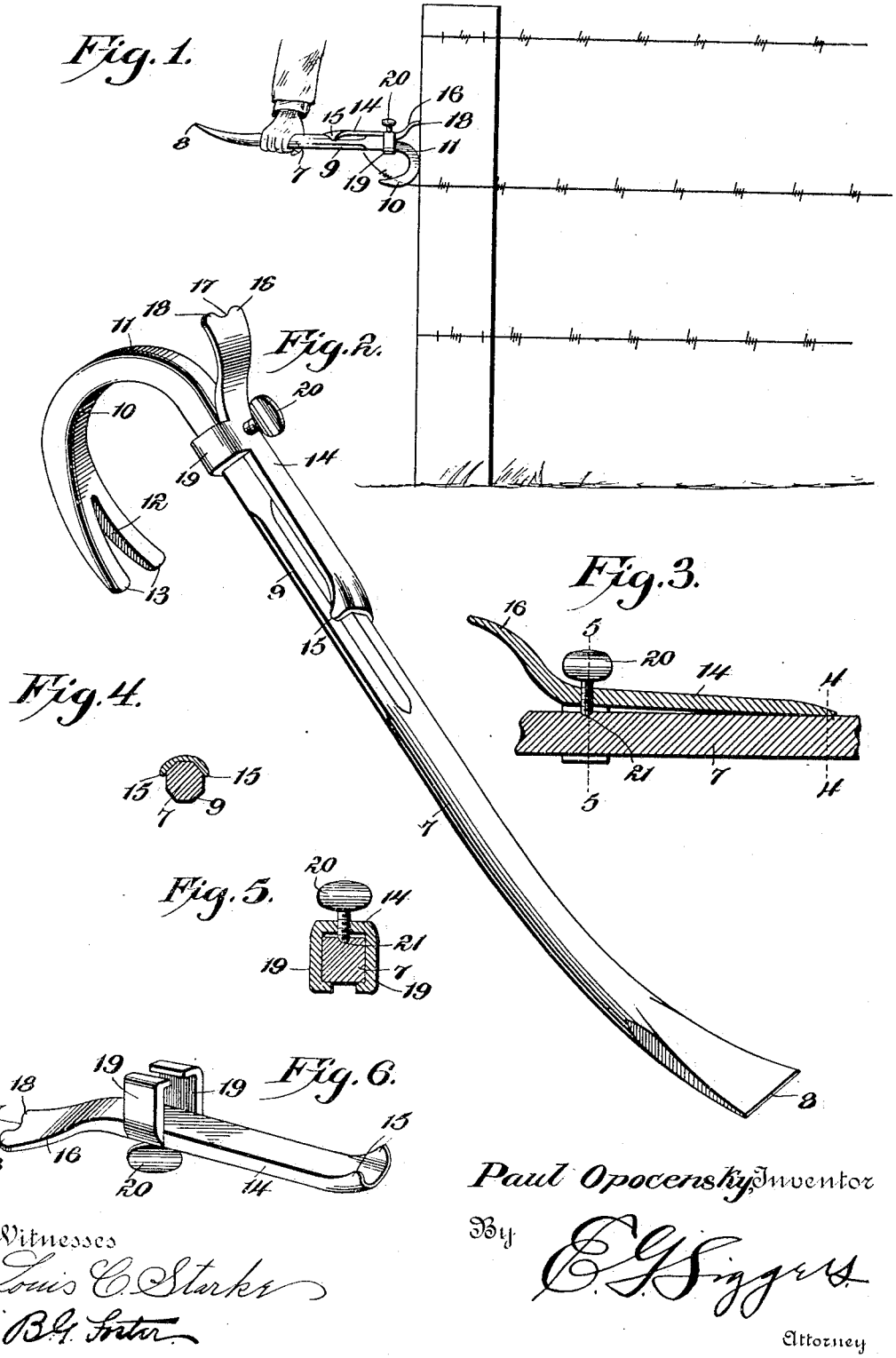

Patented February 7, 1905.

UNITED STATES PATENT OFFICE.

PAUL OPOCENSKY, OF CUBA, KANSAS.

COMBINATION-TOOL.

SPECIFICATION forming part of Letters Patent No. 782,169, dated February 7, 1905.

Application filed February 20, 1904. Serial No. 194,533.

*To all whom it may concern:*

Be it known that I, PAUL OPOCENSKY, a citizen of the United States, residing at Cuba, in the county of Republic and State of Kansas, have invented a new and useful Combination-Tool, of which the following is a specification.

This invention relates to improvements in implements of that character in which the power of the lever is employed.

The object is to provide a simple and novel combination of elements by means of which nails, spikes, or staples may be pulled, wires stretched, boards removed from their fastenings, and many analogous operations performed without difficulty and without material danger of injury to the hands of the operator.

The preferred form of construction is illustrated in the accompanying drawings, in which—

Figure 1 is a side elevation of the implement, showing the same in use in stretching wire. Fig. 2 is a perspective view of said implement on an enlarged scale. Fig. 3 is a detail longitudinal sectional view through the same. Fig. 4 is a cross-sectional view on the line 4 4 of Fig. 3. Fig. 5 is a similar view on the line 5 5 of Fig. 3. Fig. 6 is a detail perspective view of the fulcrum device.

Similar reference-numerals indicate corresponding parts in all the figures of the drawings.

In the structure illustrated a stock or shank 7 is employed, one terminal portion of which is rounded and slightly curved, the free end thereof being broadened and sharpened, as shown at 8. The intermediate portion of the shank or stock is preferably hexagonal, as shown at 9, while the terminal portion opposite the sharpened end 8 is squared and formed into an overhanging hook 10, the outer face 11 of said hook being continuously curved from the shank or stock, as illustrated. The free terminal of this hook 10 is bifurcated, as shown at 12, to form jaws or claws 13. Associated with this shank or stock is a fulcrum device comprising a flat stem 14, arranged to be placed longitudinally upon the outer side of the shank or stock and having at one end inturned spaced lips 15, adapted to embrace the hexagonal portion of the same. The opposite end of the stem is outturned to form a bearing-terminal 16, which is preferably serrated, as shown at 17, to form teeth 18. The intermediate portion of the stem has oppositely-disposed inwardly-turned keepers 19, constituting a split ring, which surrounds the square portion of the shank. A holding device in the form of a set-screw 20 passes through the stem in line with the ring and is adapted to seat itself in a recess 21, formed in the stock 7, the set-screw constituting means for detachably securing the fulcrum device against longitudinal movement on the stock, while the lips assist in preventing the lateral displacement thereof.

When the implement is to be employed in stretching wire, the fulcrum device is associated with the shank or stock, the wire to be stretched is engaged between the jaws, and the tool is arranged against a post, as illustrated in Fig. 1. It will be apparent that a powerful strain may thus be imparted to the wire for stretching the same. When nails are to be drawn, they are engaged between the claws, and the fulcrum device may be left in place or removed. In either case, however, a long circular bearing-surface is provided forming a traveling fulcrum in the operation of nail-pulling. The end of the shank opposite the hook 10 constitutes practically a crowbar for prying off boards and the like from their supports. When so used, the fulcrum device is preferably detached, and the hands of the operator are of course employed on the shank portion contiguous to the hook. This hook therefore constitutes a stop which will prevent the hands of the operator coming into contact with the supports when the boards suddenly give way, as with the ordinary crowbar.

Having thus described my invention, what I claim as new, and desire to secure by Letters Patent, is—

1. In an implement of the class described, the combination with a stock having a terminal work-engaging device offset at one side of the stock, of a fulcrum device slidably and removably mounted between its ends on the stock and located on the opposite side of said stock to the work-engaging device, one terminal portion of the fulcrum device bearing against the stock, the other overhanging the offset work-engaging device and constituting a fulcrum-bearing, and means for holding the fulcrum device at different places along the stock.

2. In an implement of the class described, the combination with a stock, terminating at one end in a curved work-engaging hook that is offset at one side of the stock, of a fulcrum device slidably and detachably mounted between its ends on the stock, one terminal portion of the fulcrum device bearing against the stock, the other being offset and overhanging the rear side of the hook, thereby constituting a fulcrum-bearing, and a holding device carried by an intermediate portion of the fulcrum device and engaging the stock to hold said fulcum device at different positions along the stock.

3. In an implement of the class described, the combination with a stock having a work-engaging device at one end, of a fulcrum device having a ring between its ends that is slidably mounted on the stock, one terminal of the device bearing against the stock, the other terminal being offset and constituting a fulcrum-bearing, and a set-screw threaded through the device and engaging the device to hold said device at different points on the stock.

4. In an implement of the class described, the combination with a fulcrum device comprising a stem arranged longitudinally upon the shank, one end of said stem being provided with inturned spaced lips that embrace the shank, the other end being offset and serrated to form a bearing, a split ring carried by an intermediate portion of the stem and surrounding the shank, and a set-screw passing through the stem contiguous to the ring and bearing against the shank.

5. In an implement of the class described, the combination with a shank or stock having an overhanging curved hook at one end, said hook having its free terminal bifurcated to form jaws, of a fulcrum device comprising a stem arranged longitudinally upon the shank, means for securing said stem against longitudinal and lateral movement on the shank, and an offset bearing-terminal constituting a part of the stem and projecting longitudinally in the direction of the hook.

6. In an implement of the class described, the combination with a stock having a work-engaging device, of a fulcrum device slidably mounted thereon and having an inturned rear end and an outturned front end, the inturned rear end engaging the stock, the front end constituting a fulcrum-bearing, and means for detachably securing the device on the stock.

In testimony that I claim the foregoing as my own I have hereto affixed my signature in the presence of two witnesses.

PAUL OPOCENSKY.

Witnesses:
JOHN KESL,
GEO. TRAVER.